United States Patent [19]

Dupuy et al.

[11] 4,141,962

[45] Feb. 27, 1979

[54] CATALYSTS FOR TREATING GASES CONTAINING SULPHUR COMPOUNDS

[75] Inventors: Georges Dupuy, Fontenay-aux-Roses; Jean-Claude Daumas, Orsay; Max Michel, Yerres, all of France

[73] Assignee: Rhone-Progil, France

[21] Appl. No.: 839,609

[22] Filed: Oct. 5, 1977

Related U.S. Application Data

[60] Continuation of Ser. No. 615,721, Sep. 22, 1975, which is a division of Ser. No. 457,923, Apr. 4, 1974, abandoned.

[30] Foreign Application Priority Data

Apr. 9, 1973 [FR] France .................................. 73.12658

[51] Int. Cl.$^2$ ............................................ C01B 17/04
[52] U.S. Cl. ..................................... 423/571; 423/576
[58] Field of Search ............... 423/230, 244, 571, 573, 423/576

[56] References Cited

U.S. PATENT DOCUMENTS

| | | | |
|---|---|---|---|
| 3,725,531 | 4/1973 | Pearson et al. | 423/570 X |
| 3,939,250 | 2/1976 | Michel et al. | 423/576 X |

FOREIGN PATENT DOCUMENTS

| | | |
|---|---|---|
| 25976 of | 1907 | United Kingdom. |
| 449710 | 7/1936 | United Kingdom. |
| 867853 | 5/1961 | United Kingdom. |

*Primary Examiner*—G. O. Peters

[57] ABSTRACT

The invention concerns catalysts for treating residual gases, containing hydrogen and carbon derivatives of sulphur, by the Claus reaction. These catalysts have a specific area of at least 80 m$^2$/g and essentially comprise active alumina and a titanium compound. They enable carbon compounds of sulphur to be destroyed and the Claus reaction proper to be obtained with good yields.

4 Claims, No Drawings

CATALYSTS FOR TREATING GASES CONTAINING SULPHUR COMPOUNDS

This is a continuation of application Ser. No. 615,721, filed Sept. 22, 1975, which in turn is a division of application Ser. No. 457,923, filed Apr. 4, 1974, now abandoned.

The invention relates to catalysts for treating residual gases containing hydrogen and carbon derivatives of sulphur.

It is known that gaseous mixtures of complex composition charged with sulphur compounds, such as the gaseous mixtures resulting from the purification of gaseous or liquid natural hydrocarbons, are frequently encountered in the chemical industry, and that very large quantities of sulphur can be recovered by purifying these mixtures. The methods of recovering the sulphur have been generally well-known for a long time but nevertheless have to be constantly improved so that, once the mixtures have been purified and are ready to be discharged into the atmosphere, their content of sulphur compounds can be reduced to the absolute minimum, in view of increasingly strict pollution standards.

Usually the greater part of the sulphur in the gaseous mixtures to be treated is in the form of hydrogen sulphide, and the recovery of the sulphur is then generally based on the well-known Claus reaction, which can be obtained in a gaseous or liquid medium, between the sulphurous anhydride which generally results from oxidation of a suitable proportion of the hydrogen sulphide, and the remainder of the hydrogen sulphide. The Claus reaction should advantageously be carried out at the lowest possible temperature as this is helpful in obtaining sulphur. The reaction can in fact be obtained at normal temperature provided that it is activated by suitable catalysts.

However, the presence of other gaseous sulphur compounds, such as carbon di-sulphide and carbonyl sulphide, greatly affects the application of gas purifying processes based on the Claus reaction, because the catalysts which are most active in the Claus reaction are not those which are most active in destroying carbon compounds of sulphur. The destruction of carbon compounds of sulphur is very likely to operate by hydrolysis, because the optimum temperatures for these various reactions are not the same and because the very presence of sulphurous gas inhibits the hydrolysis of the carbon derivatives of sulphur.

Despite the fact that, in industry, residual mixtures containing these various sulphur compounds have to be treated in a succession of catalytic stages in order to obtain a high degree of purification, the amount of hydrogen sulphide and carbon compounds of sulphur contained in the gases leaving the last stage is consequently found to exceed normally accepted standards. Moreover, the incompleteness of the purifying action becomes more and more marked with the passage of time and probably has to do with the sulphating of the catalysts. This may be due to the presence of traces of oxygen in the gases to be treated, in which case it is gradual, although it may also result from air being accidentally admitted over the incompletely cooled catalysts when the plant has been shut down.

The catalysts previously recommended to obtain these various reactions involving gaseous sulphur compounds are very numerous. In fact many are suitable and give good results, so long as one does not have to obtain the highest possible yield for a given plant and provided that one can tolerate relatively short periods of use without re-charging with fresh catalysts. Thus it has been recommended to use bauxite, activated carbon, alkalised carriers, active alumina and catalysts comprising sulphides, oxides or various compounds, including those of molybdenum, titanium, cobalt, iron and uranium deposited on various carriers.

Of all these catalysts, active alumina is the most advantageous if only the Claus reaction is considered and provided that the sulphating effect is minimised so as not to shorten the period of use. However, from the moment that the gases which have to be purified contain any appreciable proportion of carbon derivatives of sulphur the above-mentioned drawbacks become apparent.

It has now been discovered that catalysts which can be given a set of properties enabling both the destruction of the carbon compounds of sulphur and a good yield to be obtained the Claus reaction proper with the further property of long life due to their mechanical strength and to the absence of any sulphating effect on the yields obtained, are those essentially comprising active alumina and titanium compounds. This is provided that the catalysts, when ready for use, have a large enough specific surface area and that the proportions of active alumina and titanium compounds are defined. The chemical nature of the titanium compounds present in the catalysts is difficult to specify under the conditions of use, so in practice it is preferable to relate the proportions of these compounds to that of titanium oxide.

It should be noted that activated bauxites, which were formerly recognised as being suitable for use as catalysts for these various reactions, as indicated above, often contain oxides with an effective catalytic action, such as iron oxide and titanium oxide, and have a specific surface area which may be suitable. However, the amount of active oxides contained in the bauxites is variable and insufficient, and the bauxites moreover contain equally variable proportions of other compounds which may be inactive or even harmful. Accordingly bauxites do not have all the features which would enable the purification of sulphur-containing gases to be carried as far as is nowadays required and to be carried out with the constant action required.

The catalysts of the invention, having the desired properties, have a specific surface area of at least 80 $m^2/g$ and include a proportion of titanium compounds, related to titanium oxide, amounting to 1 to 60% of their weight, the remainder being alumina. Less importantly, the catalysts may further comprise small quantities of molybdenum, cobalt, nickel, iron and uranium compounds, although the presence of these other elements does not usually give any very marked improvement in results.

The catalysts according to the invention can be prepared in various ways. By way of example, a well-known and appropriate method consists of impregnating the carriers of active alumina, of the desired specific surface area, with solutions of metal compounds which are particularly adapted easily to provide the corresponding oxides by thermal decomposition. The concentration of these solutions must be chosen so as to obtain the desired quantity of catalytic elements in the final catalysts. The solutions which are easiest to use for introducing titanium are those containing titanium chlorides, oxychlorides or sulphates, although other compounds may be employed, such as various organic salts like oxalates. Other metals, if desired, can easily be added, e.g. in nitrate form.

Other suitable methods consist of agglomerating mixtures of aluminum oxides or hydroxides, e.g. active alumina, and oxides, hydroxides or other compounds of various metals. At least some of these various metal compounds may be in the form of gels, sols or solutions. It is also possible to coprecipitate the various hydroxides or other compounds or to form co-gels of hydroxides or of compounds from sols, as well as to add sols which will contribute certain metals to the compounds of other metals.

The preparation of these catalysts usually ends with a drying and an activation process. Their subsequent use involves more or less firm fixing of sulphur, the exact nature of the bond with this element is not well understood.

The various catalysts of the invention may be used in a fixed bed or in a moving, fluidised or flying bed, the dimensions of the particles making up the bed being adapted accordingly.

In order to illustrate the invention various examples will now be given of results obtained in a fixed bed with catalysts consisting of alumina and titanium in various proportions and obtained in different ways. The first example concerns a catalyst which is hardly solid, without alumina, and which is consequently outside the scope of the invention. It consists solely of titanium oxide of the desired specific surface area, the purpose of this being to show the special action of titanium in converting carbon derivatives of sulphur. The other examples make it possible to define the limits of variations from the main parameters. In all these examples, the gases are treated by the various catalysts in a small reactor 60 mm in diameter. The composition of the gases by volume is as follows:

$H_2S$: 6%
$CS_2$: 1%
$SO_2$: 4%
$H_2O$: 28%
$N_2$: 61%

The times of contact can vary up to 8 seconds and the temperatures on discharge vary from 260° to 335° C.

The gases leaving the reactor are analysed by chromatography to determine the rate of $\rho SO_2$ conversion relative to the thermodynamic yield, and the rate of $\rho CS_2$ hydrolysis of the carbon sulphide.

EXAMPLE 1

Starting with a suspension in water with 400 g of $TiO_2$ per liter of titanium hydroxide obtained by precipitation with ammonia from its sulphuric solution, a titanium sol is prepared in the conventional way by heating to about 80° C. then adjusting the pH to about 1.1 with hydrochloric acid. The micellae of this sol are about 400 Å in diameter.

The sol is dripped into the top of a glass column, the upper part of which contains petroleum mixed with a chlorofluoro hydrocarbon and the lower part of which contains a mixture, in the ratio of 1/1 by volume, of a concentrated aqueous solution of ammonia and a saturated aqueous solution of ammonium carbonate. The temperature of the column is kept at 25° C. In this way the drops gel and the lower part of the column receives pellets 2 to 5 mm in diameter which are then dried in air at 180° C. The pellets thus obtained, of a specific surface area of 220 m²/g, are separated into two batches. The first batch is used as is, while the second is artificially sulphated by heating to 450° C. for 4 hours in a mixture of 70% air and 30% $SO_2$. The two batches are used to treat the gaseous mixture of the composition indicated above. In addition, by way of comparison, the gases are treated in the identical way over pellets of active alumina of the same dimensions and the same specific surface area, in either the fresh or the sulphated state, the sulphated state being obtained by the method used for the pellets of titanium oxide.

Table I below summarises the various results obtained and also gives the values (in kg) of the resistance R to crushing of one particle by another before the various catalysts are used.

TABLE I

| Catalysts | R (Kg) | Time of contact: 3s Temperature: 320° | | Time of contact: 5s Temperature: 335° C | | Time of contact: 8s Temperature: 335° C | |
|---|---|---|---|---|---|---|---|
| | | $\rho SO_2$ | $\rho CS_2$ | $\rho SO_2$ | $\rho CS_2$ | $\rho SO_2$ | $\rho CS_2$ |
| $Al_2O_3$ pellets | | | | | | | |
| New | 15 | 90 | 45 | 94.5 | 78 | 97 | 98 |
| Sulphated | 15 | 83 | 15 | 91 | 35 | 97 | 80 |
| $TiO_2$ pellets | | | | | | | |
| New | 3 | 100 | 100 | 100 | 100 | 100 | 100 |
| Sulphated | 3 | 98 | 90 | 100 | 100 | 100 | 100 |

These results clearly show the superiority of titanium oxide over alumina so far as its action in converting both $SO_2$ and $CS_2$ is concerned, and particularly after the pellets have been sulphated. However, the resistance of the titanium oxide pellets to crushing is not sufficient for industrial use.

EXAMPLE 2

This example concerns results obtained with catalysts which contain different quantities of titanium oxide and which are obtained by impregnating pellets of active alumina with a specific surface area of 300 m²/g and with diameters from 2 to 4 mm, with solutions of titanium chloride so that the desired oxide content is achieved after drying, and calcining at 500° C. for 4 hours. Before the catalysts are used they are sulphated as described in the previous example. All the tests are carried out at 335° C. The table below summarises the results measured for $\rho SO_2$ for a contact time of 5 seconds and for $\rho CS_2$ for a contact time of 5 and 8 seconds, as well as the specific surface area of the catalysts and their resistance to crushing.

TABLE II

| Catalysts % by weight of titanium oxide relative to alumina carrier | Specific surface area of catalysts m²/g | Resistance to crushing kg | $\rho SO_2$ 5s | $\rho CS_2$ 5s | $\rho CS_2$ 8s |
|---|---|---|---|---|---|
| 0 | 250 | 15 | 91 | 35 | 80 |
| 1 | 250 | 14 | 95 | 60 | 95 |
| 5 | 220 | 14 | 100 | 75 | 100 |
| 10 | 200 | 13 | 100 | 85 | 100 |

These results give a good indication of the importance of titanium: even in a proportion of 1%, calculated in respect of titanium oxide, it is responsible for destroying most of the carbon sulphide. The strength of these various catalysts is adequate and results from the use of alumina pellets as carriers.

EXAMPLE 3

This example concerns catalysts obtained by agglomerating alumina powder with a gel of titanium hydroxide, which is a suspension of hydrolysed titanyl sulphate containing about 7% by weight of $SO_4$ — relative to $TiO_2$. The titanium hydroxide gel, dried and ground and containing 79% by weight of $TiO_2$, is intimately mixed with active alumina powder of a grain size less than 20 microns, obtained by partial dehydration of hydrargillite in a stream of hot gas, in proportions such that the final catalysts contain 10%, 20%, 40% and 60% by weight of oxide of $TiO_2$. The mixture is humidified and agglomerated in a rotary granulator in the form of pellets having a diameter of from 2 to 5 mm. The pellets are left to mature for 24 hours at about 100° C. then calcined for 2 hours at 450° C. for activation purposes. The catalysts are sulphated by the method described in the previous examples.

The results obtained are given in Table III below.

TABLE III

| Sulphated catalysts | Specific surface area m²/g | Resistance to crushing kg | $\rho CS_2$ for: 3s 310° C | 5s 335° C | 8s 335° C | $\rho SO_2$ for: 1s 260° C | 2s 290° C | 5s 335° C |
|---|---|---|---|---|---|---|---|---|
| 10% of $TiO_2$ + alumina | 190 | 15 | 20 | 45 | 97 | 35 | 65 | 100 |
| 20% of $TiO_2$ + alumina | 195 | 12 | 30 | 57 | 98 | 45 | 72 | 100 |
| 40% of $TiO_2$ + alumina | 195 | 11 | 45 | 87 | 100 | 65 | 82 | 100 |
| 60% of $TiO_2$ + alumina | 190 | 9 | 65 | 95 | 100 | 66 | 86 | 100 |

This table shows the importance of catalysts containing titanium as compared with the results obtained with alumina alone. It also shows that in this type of catalyst, obtained by agglomerating the mixture of oxides, more titanium oxide has to be used if very good results are to be obtained. However, this preparation method has the advantage of avoiding the process of impregnating with titanium chloride, as in Example 2, which has some drawbacks owing to the difficulty of handling the product.

EXAMPLE 4

This example concerns catalysts which are agglomerated in the form of pellets from 2 to 5 mm in diameter and obtained from an alumina identical with that used in the preceding example and from titanium hydroxide sol in proportions such as will give a $TiO_2$ content of 10%, 20%, 30%, 40% and 60% in the final catalysts. The sulphated catalysts are tested by the method described above: the results are set out in Table IV below.

TABLE IV

| Sulphated catalysts | Specific surface area m²/g | Resistance to crushing kg | $\rho CS_2$ for: 3s 320° C | 5s 335° C | 8s 335° C | $\rho SO_2$ for: 1s 260° C | 2s 280° C | 5s 335° C |
|---|---|---|---|---|---|---|---|---|
| 10% of $TiO_2$ + alumina | 200 | 14 | 25 | 54 | 96 | 40 | 70 | 100 |
| 20% of $TiO_2$ + alumina | 195 | 12 | 35 | 65 | 98 | 49 | 76 | 100 |
| 30% of $TiO_2$ + alumina | 194 | 12 | 45 | 85 | 100 | 58 | 81 | 100 |
| 40% of $TiO_2$ + alumina | 198 | 10 | 50 | 94 | 100 | 69 | 86 | 100 |
| 60% of $TiO_2$ + alumina | 191 | 8 | 70 | 96 | 100 | 65 | 90 | 100 |

The results obtained here come close to those obtained in Example 3.

EXAMPLE 5

The purpose of this example is to show the effect of the specific surface area of the catalysts on the results obtained.

The catalysts tested are all obtained by the impregnation method described in Example 2, so that they finally contain 5% by weight of $TiO_2$ oxide. The impregnated pellets of active alumina vary in their specific surface area, so that the final catalysts also vary in this respect. The catalysts are tested in the sulphated state with a contact time of 5 seconds to determine the $\rho SO_2$ and for 5 and 6 seconds to determine the $\rho CS_2$.

The results obtained are recorded in Table V below.

TABLE V

| Specific surface area of catalysts in m²/g | $\rho SO_2$ 5s | $\rho SO_2$ 5s | 8s |
|---|---|---|---|
| 30 | 40 | 41 | 70 |
| 80 | 70 | 62 | 90 |
| 150 | 95 | 73 | 98 |
| 200 | 100 | 75 | 100 |
| 250 | 100 | 85 | 100 |

This table shows the need for an adequate specific surface area, 80 m²/g being the limit below which yields drop sharply.

The above examples do not restrict the invention to treatments for gases of the composition mentioned. This composition was used solely because the main purpose of the invention is the joint destruction of hydrogen sulphide, of sulphurous gas and of carbon derivatives of sulphur. The catalysts of the invention can obviously be used to treat gaseous mixtures which are far richer in sulphur compounds and which may further comprise, e.g. carbondioxide and ammonia, which do not react.

We claim:

1. A process for catalytically recovering sulphur from a gas stream comprising hydrogen sulfide, sulfur dioxide, water vapor and carbon-sulphur compounds consisting essentially of carbon disulfide and/or carbonyl sulfide which comprises reacting carbon-sulphur compounds consisting essentially of carbon disulfide and/or carbonyl sulfide with water vapor to produce by hydrolysis carbon dioxide and hydrogen sulfide and simultaneously reacting hydrogen sulfide and sulphur dioxide to produce water vapor and elemental sulphur whereby the carbon-sulphur compounds are eliminated from the gas stream and sulphur is recovered therefrom, said reactions being carried out in the presence of a catalyst consisting essentially of activated alumina and a titanium compound, the titanium compound being present in an amount within the range of 1-60% by weight expressed as titanium oxide, the catalyst having the specific surface area greater than 80 $m^2/g$ and the temperature of the reaction zone being such that the product gases at the conclusion of the reaction have a temperature ranging from 260°-335° C., and recovering the sulphur thus formed.

2. A process as defined in claim 1 wherein the titanium compound is titanium oxide.

3. A process for catalytically recovering sulphur from a gas stream comprising hydrogen sulfide, water vapor, sulphur dioxide and carbon-sulphur compounds consisting essentially of carbon disulfide and/or carbonyl sulfide comprising contacting said gas stream with a catalyst consisting essentially of activated alumina and a titanium compound, said titanium compound being present in an amount within the range of 1-60% by weight expressed as titanium dioxide and the catalyst having a specific surface area greater than 80 $m^2/g$, the temperature of the reaction being such that the product gases at the conclusion of the reaction have a temperature ranging from 260°-335° C., whereby said carbon-sulphur compounds present in said gas stream are converted to carbon dioxide and hydrogen sulfide, the hydrogen sulfide present in the gas stream reacting with sulphur dioxide to form water vapor and sulphur, and recovering the sulphur.

4. A process as defined in claim 3 wherein the titanium compound is titanium oxide.

* * * * *